United States Patent [19]

Jabloner et al.

[11] Patent Number: 4,789,722

[45] Date of Patent: Dec. 6, 1988

[54] POLYARYLENE POLYETHER MADE USING MIXED BASE SYSTEM

[75] Inventors: Harold Jabloner, New Castle; Tuyen T. Nguyen, Wilmington, both of Del.

[73] Assignee: Hercules Incorporated, Wilmington, Del.

[21] Appl. No.: 80,144

[22] Filed: Jul. 29, 1987

Related U.S. Application Data

[63] Continuation of Ser. No. 823,912, Jan. 30, 1986, abandoned.

[51] Int. Cl.[4] .................... C08G 65/40; C08G 65/48; C08G 75/23
[52] U.S. Cl. .................................... 528/172; 528/210
[58] Field of Search ............... 528/172, 175, 210, 218, 528/219

[56] References Cited

U.S. PATENT DOCUMENTS

| | | | |
|---|---|---|---|
| 2,822,351 | 2/1958 | Kreuchunas | 260/79.3 |
| 3,264,536 | 8/1966 | Robinson et al. | 317/258 |
| 3,332,009 | 7/1967 | Farnham et al. | 260/47 |
| 3,332,909 | 7/1967 | Farnham et al. | 260/47 |
| 3,503,931 | 3/1970 | Radlmann et al. | 260/49 |
| 3,539,655 | 11/1970 | Strachan et al. | 260/824 |
| 3,554,972 | 1/1971 | Cornell | 260/49 |
| 3,563,951 | 2/1971 | Radlmann et al. | 260/47 |
| 3,622,541 | 11/1971 | Darsow | 260/49 |
| 3,647,751 | 3/1972 | Darsow | 260/49 |
| 3,723,389 | 3/1973 | Khattab | 260/49 |
| 3,736,293 | 5/1973 | Novak | 528/219 |
| 4,000,499 | 8/1977 | Kaufman | 260/61 |
| 3,775,368 | 11/1973 | Leslie et al. | 260/49 |
| 3,809,682 | 5/1974 | Studinka et al. | 260/61 |
| 3,886,120 | 5/1975 | Yagi et al. | 260/49 |
| 3,886,121 | 5/1975 | Yagi et al. | 260/49 |
| 3,895,064 | 7/1975 | Brede et al. | 260/571 |
| 3,920,768 | 11/1975 | Kwiatkowski | 260/837 |
| 4,000,499 | 8/1983 | Colon | 528/210 |
| 4,039,511 | 8/1977 | Wulff et al. | 260/49 |
| 4,051,109 | 9/1977 | Barr | 528/175 |
| 4,105,635 | 8/1978 | Freeman | 528/126 |
| 4,105,636 | 8/1978 | Taylor | 528/126 |
| 4,108,837 | 8/1978 | Johnson et al. | 528/126 |
| 4,110,314 | 8/1978 | Yagi et al. | 528/26 |
| 4,155,068 | 5/1979 | Hartmann | 528/175 |
| 4,169,178 | 9/1979 | Freeman | 528/126 |
| 4,176,222 | 11/1979 | Cinderey | 528/126 |
| 4,186,262 | 1/1980 | Freeman et al. | 526/126 |
| 4,200,727 | 4/1980 | Blinne et al. | 528/125 |
| 4,275,186 | 6/1981 | Kawakami et al. | 528/174 |
| 4,307,222 | 12/1981 | Schwab et al. | 528/174 |
| 4,331,798 | 5/1982 | Staniland | 528/125 |
| 4,476,184 | 10/1984 | Lubowitz et al. | 428/288 |
| 4,517,354 | 5/1985 | D'Alelio | 528/172 |
| 4,533,721 | 8/1985 | Kurosawa et al. | 528/174 |
| 4,536,559 | 8/1985 | Lubowitz et al. | 528/170 |
| 4,638,044 | 1/1987 | Kelsey | 528/219 |
| 4,717,761 | 1/1988 | Staniland . | |

FOREIGN PATENT DOCUMENTS

| | | |
|---|---|---|
| 143407A3 | 11/1983 | European Pat. Off. . |
| 2038241 | 2/1971 | Fed. Rep. of Germany . |
| 55-013702 | 1/1980 | Japan . |
| 72311 | 12/1974 | Poland . |
| 85252 | 2/1977 | Poland . |
| 1558671 | 1/1980 | United Kingdom . |

OTHER PUBLICATIONS

B. A. Trofimov et al: AZV. Akad. Nauk SSSR, Ser. Khim. No. 4, 751 (1986).

J. Polymer Science, Part A-1, vol. 5, 2380, 2381 (1967).

"Poly(aryl Ethers) by Nucleophilic Aromatic Substitution. I. Synthesis and Properties," R. N. Johnson, A. G. Farnham, R. A. Clendinning, W. F. Hale and C. N. Merriam, Journal of Polymer Science: Part A-1, vol. 5, 2375-2398 (1967).

"High Temperature Polymers. I.—Sulfone Ether Diamines for Tractable High Temperature Polymers" by James H. Kawakami, George T. Kwiatkowski, George L. Brock and Albert W. Bedwin, Journal of Polymer Science: Polymer Science Edition, vol. 12, 565-573 (1974).

May, 1981 NASA Report, "Synthesis and Characteristics of Polyarylene Ether Sulfones" (Final Report to NASA—Research Grant NSG 1559) by R. Visawanathan, B. C. Johnson, T. C. Ward and J. E. McGrath.

*Primary Examiner*—Veronica P. Hoke
*Attorney, Agent, or Firm*—Edmund C. Ross, Jr.

[57] ABSTRACT

Polyarylene polyethers, made by a process comprising reacting a dihydroxy compound and strong and weak bases in a liquid reaction medium at 100°–200° C. to form a double salt and then reacting the double salt with a slight molar excess of dihalobenzenoid compound bearing two replaceable halogens, are disclosed. The process reliably produces halogen-terminated polyarylene polyethers of select degrees of polymerization and desirable correspondence between weight and number average molecular weights. In subsequent steps amineterminated polyarylene polyethers are made using the strong and weak bases. The resulting amine-terminated polyethers have a low, select degree of polymerization, desirable correspondence between weight and number average molecular weights and high level of amine termination.

33 Claims, No Drawings

POLYARYLENE POLYETHER MADE USING MIXED BASE SYSTEM

This application is a continuation of application Ser. No. 823,912, filed Jan. 30, 1986 now abandoned

BACKGROUND OF THE INVENTION

This invention relates to an improvement in phenolate reactants used in making polyarylene polyethers by condensation reactions. This invention also relates to the use of these phenolate reactants in manufacture of halogen-terminated polyarylene polyethers with a low, but select, degree of polymerization and in conversion of such halogen-terminated polyarylene polyethers to polyarylene polyethers having terminal amine functionality. This invention still further relates to a method that enables production of these polyarylene polyethers with greatly improved reliability and desirable correspondence between weight average and number average molecular weights.

PRIOR ART

Polyarylene polyethers are well known and commercially available as thermoplastic resins. U.S. Pat. No. 4,108,837, for example, describes high molecular weight polyarylene polyethers and a process for making them. The process involves condensing substantially equimolar amounts of a dihalobenzenoid compound and the double salt of a dihydroxy phenol in a reaction medium comprising polar solvent and azeotrope former.

Lower molecular weight polyarylene polyethers are also known. U.S. Pat. No. 4,275,186 (Example 1) shows that hydroxy-terminated polyarylene polyethers having a low degree of polymerization may be made. The procedures of U.S. Pat. No. 4,275,186 are similar to those shown in U.S. Pat. No. 4,108,837 but a molar excess of the double salt of the dihydroxy phenol is used. Further, U.S. Pat. Nos. 3,539,655 and 3,563,951 both suggest the possibility of making halogen-terminated polyarylene polyethers having low degrees of polymerization using an excess of the dihalobenzenoid compound. And, U.S. Pat. Nos. 3,895,064 and 3,920,768 exemplify amine-terminated polyarylene polyethers of very low degrees of polymerization made by reacting halogen-terminated polyarylene polyethers or reactants forming such polyethers with aminophenolates.

This prior art has not shown how amine-terminated polyarylene polyethers having a low, but select, degree of polymerization may be produced reliably on an industrial scale. Manufacture of these polyarylene polyethers on such a scale is a difficult and expensive task using the prior art procedures; unuseable product often results.

In the abstract, manufacture of halogen-terminated polyarylene polyethers having a low, but select degree of polymerization might be considered relatively simple. A halogen-terminated polyarylene polyether having a degree of polymerization of, for example, about ten (10) would be made by reacting a ten (10) percent molar excess of the dihalobenzenoid compound over the moles of the double salt of the dihydric phenol. The ten (10) percent molar excess in theory would provide one extra molecule of the dihalobenzenoid compound for every ten (10) pair of the dihalobenzenoid compound and double salt molecules being condensed and thereby terminate the condensation (on a statistical basis) at that point.

In practice, however, the foregoing theoretical relationship between reactant ratio and final degree of polymerization has not been obtained using the prior art procedures. Rather, the condensation reaction is very sensitive to reactant concentration; and small deviations caused, for example, by ordinary weighing imprecision as well as by sampling during the long period of reaction required can upset the delicate balance of reactants and condensation product. Moreover, dihalobenzenoid compounds as well as the condensing polyarylene polyether are subject to hydrolysis by the same base that is used to prepare the double salt of the dihydroxy phenol. As a consequence, extra base can cause hydrolysis and thereby reduce molecular weight. On the other hand, a deficiency in the amount of base can upset the reaction stoichiometry as well.

For example, when a base such as potassium hydroxide is used in making the phenolate reactants, small excesses of the base subjects the condensing polyarylene polyether to hydrolysis and small deficiencies make the stoichiometry incorrect. On the other hand, use of a base such as potassium carbonate makes the reaction sensitive to temperature and requires higher temperatures for reasonable reaction rate. These higher temperatures, however, can cause undesired side reactions including solvent degration.

OBJECTS OF THE INVENTION

It is an object of this invention to provide polyarylene polyethers having a low, but select degree of polymerization.

It is an object of this invention to provide polyarylene polyethers with a desirable correspondence between weight average molecular weight and number average molecular weight.

It is an object of this invention to provide amine-terminated polyarylene polyethers that have a select degree of polymerization, desirable correspondence between weight average and number average molecular weights and a high level of amine termination.

It is an object of this invention to provide a reliable method of producing these polyarylene polyethers.

These and other objects have been accomplished by this invention and are more fully described in the following disclosure.

SUMMARY OF THE INVENTION

It has been discovered that by making the double salt of a dihydroxy phenol with certain mixed alkali metal bases and using this double salt in a two step process of making polyarylene polyethers, the degree of polymerization of the resulting polyarylene polyether may be selected within precise limits. It has been further discovered that subsequent condensations of the polyarylene polyether made in acccordance with this invention can also be facilitated by the use of such a mixed base system.

This invention in more express terms relates to an improvement in the manufacture of polyarylene polyethers made by condensing a dihalobenzenoid compound and the double salt of a dihydroxy phenol at a temperature in a range between about 100° C. and 200° C. and in the presence of a polar solvent and an azeotrope former. The polyarylene polyether first produced according to this invention is a halogen-terminated polyarylene polyether with a degree of polymerization between 6 and 15. The halogen-terminated polyarylene polyether is made using the double salt derived from reacting the dihydroxy phenol with a mixed alkali metal base. The mixed alkali metal base comprises a strong base and a weak base. The molar ratio of the strong base and dihydroxy phenol is between 1:1.50 and 1:1.98. The weak base is at a level such that there is at least one equivalent of alkali metal from the strong and weak bases for each equivalent of hydroxyl in the dihydroxy phenol. The reaction between the dihalobenzenoid compound and the double salt prepared using the mixed base is at a molar ratio between 1.167:1 and 1.067:1 and continues until the desired polyarylene polyether is obtained.

This invention also relates to converting the halogen-terminated polyarylene polyether into an amine-terminated polyarylene polyether. A mixed base is also used in making this conversion. The mixed base is reacted with a hydroxy aromatic amine such that there is between 0.5 and 0.98 moles of strong alkali metal base for each mole of the hydroxy aromatic amine. There are enough moles of the weak alkali metal base in the mixed base to provide at least one equivalent of alkali metal for each equivalent of hydroxy in the hydroxy aromatic amine.

This invention still further relates to amine-terminated polyarylene polyethers produced using practices of this invention.

DETAILED DESCRIPTION OF THE INVENTION

The double salts used in making the polyarylene polyethers of this invention are the reaction products of strong and weak bases and dihydroxy phenols in certain proportions. Slightly less that one equivalent of the strong base is used in the reaction for each equivalent of the dihydroxy phenol. The number of equivalents of the weak base at least equals the number of equivalents by which the strong base falls short of the number of equivalents of the dihydroxy phenol.

In more specific terms, the double salt is a reaction product of a dihydroxy phenol and a strong base such as an alkali metal hydroxide at a molar ratio between about 1:1.50 to 1:1.98 (preferably, 1:1.90 to 1:1.98) together with a weak base such as alkali metal carbonate or bicarbonate. The weak base is used at a level at least equal to the excess of the equivalents of the dihydroxy phenol over the equivalents of the strong base. Preferably, there are between about 1.92 and 1.98 moles of the alkali metal hydroxide for each mole of the dihydroxy phenol. Also, the moles of the weak base preferably do not exceed 50% (more preferably 25%) of the moles of the strong base.

The dihydroxy phenol may be a single dihydroxy material such as bisphenol A or a combination of dihydroxy materials such as a combination of bisphenol A and 2,7-napthalenediol. Dihydroxy aromatic compounds are preferred. The dihydroxy phenol may be a mono-nuclear, di-nuclear or polynuclear phenol in which a benzene nuclei is fused together or linked through a valence bond or linking group such as alkylene or alkylidene (e.g. isopropylidene). Examples of the dihydroxy phenol appear in U.S. Pat. No. 4,108,837 which is herein incorporated by reference for such disclosure. Dihydroxy di-nuclear phenols such as bisphenol A or biphenol are preferred in making polyarylene polyethers of the low degrees of polymerization with high glass transition temperatures.

The strong base is preferably potassium hydroxide although cesium hydroxide, for example, is of similar efficiency but higher in cost. Other strong bases are sodium hydroxide and potassium ethoxide. (When bases such as alkali metal alkoxides are used, the alcohol resulting in the dehydration reaction is desirably removed.) Potassium is the preferred alkali metal for both the strong and weak alkali metal bases.

The weak base is preferably potassium carbonate. Potassium bicarbonate may be used alone or in combination with potassium carbonate but is less preferred. Other alkali metal carbonates or bicarbonates such as cesium carbonate or bicarbonate are useful as well.

A liquid reaction medium is used in forming the double salt of the dihydroxy phenol in accordance with this invention. The medium preferably comprises a highly polar solvent (e.g. dimethyl sulfoxide) that is stable at high temperatures. An azeotrope former such as toluene or chlorobenzene is preferably used in combination with the highly polar solvent. The azeotrope former permits water to be withdrawn from the reaction medium through heating to the reflux temperature.

The reaction medium may be formed in any order but preferably the polar solvent and azeotrope former are added first to the reactor. The dihydroxy phenol is then preferably added and the contents of the reactor sparged with a gas like nitrogen to reduce the gaseous oxygen present to less than 200 parts per million free oxygen.

The strong and weak bases are conveniently added in water solutions that are desirably sparged before addition. The strong base is preferably added first in a 30–50% by weight aqueous solution of the base. The reactor contents can be heated prior to addition of the weak base but such heating is not required. The weak base is also preferably added as an aqueous solution that is desirably between about 40–60% by weight weak base. The contents of the reactor may be refluxed to remove water. Water withdrawal continues in preferred embodiments until there is less than 1% and more preferably less than 0.1% by weight water or even less in the reaction medium.

The weight ratio of the polar solvent to the azeotrope former is preferably between about 10:1 to 1:1 at the start of the dehydration reaction; and the weight ratio of the polar solvent to the dihydroxy phenol is between about 4:1 to 12:1 at that time. Additional azeotrope former may be added during the course of the dehydration to maintain a preferred temperature below about 140° C.

The dihalobenzenoid compound is preferably added to the double salt of the dihydroxy phenol in making the polyarylene polyethers of this invention. Other orders of addition are also possible. For example, an additional amount of the dihydroxy phenol, added after initial formation of the halogen-terminated polyarylene polyether, may be used to increase molecular weight. The use of excess weak base facilitates the reaction of this added dihydroxy phenol permitting the increase in molecular weight.

A liquid vehicle may be used for transporting the dihalobenzenoid compound and this liquid vehicle can be the same as the azeotrope former, e.g. toluene. Also, the same polar solvent used in making the double salt of the dihydroxy phenol, e.g. dimethylsulfoxide may be used as a rinse for completing transfer of the dihalobenzenoid compound. For faster reactions, the dihalobenzenoid compound is delivered at elevated temperatures, e.g. 100°–120° C. to the reactor containing the double salt of the dihydroxy phenol which is also maintained at such elevated temperatures.

The dihalobenzenoid compound may be a single dihalobenzenoid material such as 4,4'-dichlorodiphenylsulfone or a combination of dihalobenzenoid materials. The dihalobenzenoid compound is preferably a dichloro compound that is a bridged di-nuclear compound such as 4,4'-dichlorodiphenylsulfone or 4,4'-dichlorodiphenyl ketone. Other dihalobenzenoid compounds suitable herein include those disclosed in columns 7, 8 and 9 of U.S. Pat. No. 4,400,499 which are hereby incorporated herein by reference.

The molar ratio of the dihalobenzenoid compound to the double salt depends on the degree of polymerization chosen for the polyarylene polyether. Advantageously, this invention permits the degree of polymerization to be selected ahead of time and the reactant levels chosen accordingly. For example, molar ratios between about 1.067:1 and 1.167:1 provide a degree of polymerization between about 6 and 15, depending on the exact ratio selected. For making halogen-terminated polarylene polyethers which can be readily converted into amine-terminated polyarylene polyether useful in crosslinkable epoxy compositions (see, for example U.S. Ser. No. 702,518 filed Feb. 19, 1985 (now U.S. Pat. No. 4,656,207) and assigned to Hercules Incorporated), the ratio of the moles of the dihalobenzenoid compound to the double salt of the dihydroxy phenol compound is about 1.10:1. This later ratio provides a degree of polymerization between 8 and 12.

The dihalobenzenoid compound and double salt of the dihydroxy phenol are reacted at a temperature and for a time sufficient to produce the desired polyarylene polyether. The temperature of the reaction ranges between about 110° and 180° C. and more preferably between 145° and 165° C. Reaction completion is signified when analysis of the polyarylene polyether product shows a constant level of halogen termination for an extended period, e.g. fifteen or more minutes. Normally, this condensation step takes several hours when the preferred dichlorodibenzenoid compounds are condensed with the preferred dihydroxy dinuclear phenols. The resulting halogen-terminated polyarylene polyethers preferably have less than 0.01 milliequivalents of hydroxy per gram of the polyarylene polyether. The ratio between weight average molecular weight and number average molecular weight, i.e. polydispersity of the resulting halogen-terminated polyarylene polyethers ranges between 2.0 and 4, more usually between 2 and 3.4.

The halogen-terminated polyarylene polyethers of this invention are modified by condensing them with salts of hydroxy aromatic amines. This condensation is done in steps with the salt of the hydroxy aromatic amine prepared first in a separate reactor and then condensed with the halogen-terminated (preferably chlorine-terminated) polyarylene polyether.

The salt of the hydroxy aromatic amine is prepared by a dehydration reaction using strong and weak bases. Slightly less than one equivalent of the strong base is used for each equivalent of the hydroxy aromatic amine. The number of equivalents of the weak base at least equals the number of equivalents by which the strong base falls short of the number of equivalents of the hydroxy aromatic amine.

The salt of the hydroxy aromatic amine is preferably prepared by reacting the hydroxy aromatic amine and an alkali metal hydroxide at a molar ratio between 1:0.90 and 1:0.98 together with a weak base such as potassium carbonate or bicarbonate. The weak base is at a level at least equal to the excess of equivalents of the hydroxy aromatic amine over the equivalents of the strong base. There is desirably between 0.94 and 0.98 moles of the alkali metal hydroxide for each mole of the hydroxy aromatic amine and the moles of the weak base do not exceed 25% of the moles of the strong base. The preferred alkali metal is potassium and potassium carbonate is preferred as the weak base.

The hydroxy aromatic amine is dehydrated in the presence of a highly polar solvent such as dimethylsulfoxide along with an azeotrope former such as toluene. The weight ratio of the polar solvent to the hydooxy aromatic amine desirably ranges between 0.5:1 and 15:1. The weight ratio of the azeotrope former to the highly polar solvent ranges preferably between 0.5:1 and 5:1.

The hydroxy aromatic amine is dehydrated typically at temperatures between about 110° C. and 180° C. A preferred range is between about 115° C. and 125° C. Typical time for dehydration is between three and six hours although factors such as higher temperatures and less solvent can shorten this time. Dehydration of the hydroxy aromatic amine continues until the reaction media in which the salt of the hydroxy aromatic amine is formed has less than about 3% by weight water, more preferably less than 1% by weight water.

The amount of the salt of the hydroxy aromatic amine condensed with the halogen-terminated polyarylene polyether depends upon the amount of halogen present in the polarylene polyether and the desired molecular weight of the final product. Thus, for example, if the halogen-terminated polyarylene polyether has a desired molecular weight, then the molar ratio of the halogen in the halogen-terminated polyarylene polyether to the salt of the hydroxy aromatic amine is 1:1. However, if the molecular weight of the halogen-terminated polyarylene polyether is too high as would be the case if lower than expected levels of halogen were present per weight of polyarylene polyether, then slightly greater than a 1:1 molar ratio of the salt to the halogen would be used to cause a molecular weight reduction. The reduction in molecular weight occurs through hydrolysis of the polyarylene polyether.

The amine-terminated polyarylene polyether is recovered by removal of insoluble particulate formed from the liquid reaction medium and then coagulation of the polyarylene polyether from the separated liquid using coagulation by water or an alcohol such as methanol. The amine-terminated polyarylene polyethers coagulated in water tend to have a lower glass transition temperature and higher amine content than those coagulated in alcohol, apparently due to solubility of the lower weight amines.

A variety of hydroxy aromatic amines may be used in making amine-terminated polyarylene polyethers. Preferred hydroxy aromatic amines are monoamines such as 1,3- or 1,4-aminophenols. The hydroxy aromatic amine may be substituted by other groups such as lower alkyl groups and nitro groups. The hydroxy aromatic amine may be a single amine or a combination of amines whereby, in the later case, the resultant amine-terminated polyarylene polyether has different amine end groups.

The preferred halogen-terminated polyarylene polyethers have less than 0.01 milliequivalents of hydroxy per gram of the polyarylene polyether. The amine terminated polyarylene polyethers have at least about 60%

(more preferably 80% or higher up to about 95%) of the terminal groups which are amine groups (when a hydroxy aromatic monoamine is used, as preferred, for conversion to the amine-terminated polyether). The remainder of the terminal groups are hydroxy groups and chlorine groups in the preferred amine-terminated polyarylene polyethers. Also, the preferred amine-terminated polyarylene polyethers have less than about 0.03 milliequivalents of chlorine per gram of the polyether and a glass transition temperature (Tg) of at least about 150° C.

The amine-terminated polyarylene polyether resulting in accordance with preferred practice of this invention are characterized by the formula:

$$X + QODO \overline{\smash{\big)}_n} Y$$

where O is oxygen; n is between 6 and 15, more preferably between about 8 and 12; X is halogen, hydroxyl or O—R (NH$_2$)$_m$ where m is 1 or 2; Y is QX or hydrogen; Q is the residuum of a dihalobenzenoid compound having two replaceable halogens; D is the residuum of a dihydroxy phenol; R is a di or trivalent aromatic group having up to four aromatic nuclei (more preferably having a single benzene nuclei that is a 3- or 4-phenylene group); and at least about 60% (more preferably, 75% or higher) of the total X and Y groups comprise —NH$_2$ with at least about 5% of the total X and Y groups comprising hydroxyl and/or chlorine. More preferably, Q is the residuum of a dinuclear compound such as 4,4'-dichlorodiphenylsulfone and D is the residuum of a dihydroxy diphenyl compound such as bisphenol A or biphenol. Number average molecular weight is preferably between about 3000 and 7000, and the ratio of weight average molecular weight to number average molecular weight is preferably between 2.0 and 3.6. The Tg of the preferred amine-terminated polyarylene polyether range between about 150° C. and 180° C. using differential scanning calorimetry.

The amine-terminated polyarylene polyethers of this invention find wide application. For example, these polyethers are useful in making tough epoxy thermosets as shown in U.S. Ser. No. 702,518 filed Feb. 14, 1985. The halogen-terminated polyethers are useful as intermediates in forming the amine-terminated polyethers and as additives for thermoplastic resins.

The following examples illustrate this invention and are not intended to limit its scope. In these examples all parts are parts by weight, all pressures are gage pressures and all temperatures are in degrees centigrade unless noted otherwise. Also, K$_{IC}$, critical stress intensity factor, and G$_{IC}$, fracture energy, were determined in accordance with the procedures of U.S. Ser. Nos. 702,518 and 724,133 filed respectively on Feb. 19, 1985 and Apr. 16, 1985, both in the name of Chu, Jabloner and Swetlin (now, respectively, U.S. Pat. Nos. 4,656,207 and 4,656,208) and herein incorporated by reference.

EXAMPLE 1 a. Dehydration of Bisphenol A Reactant

Dimethylsulfoxide (425 parts) and toluene (100 parts) were charged to a sealed stainless steel reactor jacketed for external temperature control. The reactor was also equipped with a stirrer, thermometer, an overhead condenser, and a dip tube connectable to a source of nitrogen. After the toluene and dimethylsulfoxide mixture was sparged with nitrogen for two hours, Bisphenol A (70.7 parts) was added. The reactor was then reduced to less than 100 parts per million (ppm) oxygen while its contents were heated to 55° C. A sparged aqueous solution of potassium hydroxide (80.9 parts, 41.63% by weight KOH) was then added and the temperature raised to 80° C. Next, a sparged aqueous solution of potassium carbonate (10 parts K$_2$CO$_3$ and 10 parts deionized water) was added and the temperature raised to 115° C. The contents of the reactor were maintained between 115° C. and 140° C. while water was removed as formed from the bottom of the condenser. Toluene (20 parts) was added when the temperature rose above 140° C. The final product had less than 1% by weight water.

b. Preparation of 4,4'-dichlorodiphenylsulfone Reactant

While dehydration continued in the stainless steel reactor, toluene (200 parts) was added to a second reactor jacketed for temperature control. The second reactor was equipped with a stirrer and thermometer and for communication with the stainless steel reactor and with a source of nitrogen. The toluene in the second reactor was sparged with nitrogen for two hours. Then 4,4'-dichlorodiphenylsulfone (97.9 parts) was added to the second reactor with stirring and the second reactor reduced to less than 100 ppm oxygen. While sparging continued in the second reactor, the temperature was raised to 100° C. and maintained at this temperature.

c. Polymerization Reaction

A sample of the contents in the stainless steel reactor was found to contain less than 0.1% by weight water by Karl Fischer analysis. The contents of the stainless steel reactor were then cooled to 115° C. and the contents of the second reactor pneumatically transferred to the stainless steel reactor using nitrogen gas (10 psig). Nitrogen sparged dimethylsulfoxide (75 parts) was then added to the second reactor, agitated for five (5) minutes and transferred using the pressurized nitrogen to the stainless steel reactor. The contents of the stainless steel reactor were heated to 160° C. with removal of toluene. This temperature was maintained while the toluene refluxed until a sample of the chlorine-terminated polyarylene polyether showed less than 0.01 milliequivalents (meq) of hydroxy per gram (gm).

d. Preparation of p-Aminophenolate Reactant

While the contents of the stainless steel reactor were being kept at 160° C., dimethylsulfoxide (120 parts) and toluene (50 parts) were charged to a glass lined reactor and sparged for four (4) hours. The polyether sample showing, as noted previously, less than 0.01 meq/gm of hydroxyl also was found to have 0.42 meq/gm chlorine as end groups. This was used to determine that 6.8 parts of p-aminophenol be added to the glass lined reactor along with 1 part of potassium carbonate (in a 50:50 solution of water). The glass lined reactor was inerted to less than 50 ppm oxygen and 8.1 parts of an aqueous solution of potassium hydroxide (41.63% by weight KOH) added. The contents of the glass lined reactor were then heated slowly to a temperature of 140° C. The water and toluene began to reflux at 120° C. and the water was drained from the bottom of the condenser.

e. Condensation Reaction

Meanwhile, the reaction in the stainless steel reactor being complete, the contents were cooled to 110° C. After a sample of the glass lined reactor showed less that 1% water, then contents (aminophenolate) of the glass lined reactor were added to the stainless steel reactor. The combined contents in the stainless steel reactor were then heated to 140° C. During this heating sparged dimethylsulfoxide (50 parts) was added to flush the glass lined reactor and passed from the glass lined reactor into the stainless steel reactor. The contents of the stainless steel reactor were maintained at 140° C. for about six hours when a sample thereof was taken and determined to be acceptable by end group analysis. The stainless steel reactor was slowly cooled to 115° C. while under a 250 mm Hg causing removal of toluene and dimethylsulfoxide. Cooling was continued until the contents of the stainless steel reactor reached 60° C. whereupon sodium sulfite (6 parts) was added. The contents of the stainless steel reactor were filtered through a 50 micron filter bag to remove potassium salts.

f. Separation of Amine-Terminated Polyarylene Polyether

Methanol and a portion of the filtrate of step (e) were combined at a volume ratio of 5:1 and sodium hydroxide and sodium hydroxide added at about 4 and 2 parts per hundred parts of this combination. Agitation of the mixture was followed by filtration. A vacuum was pulled on the filter until a dry cake was formed. The cake was washed several times with deionized water. The wash continued until the filtrate was free of chlorine ions using a silver nitrate test. Methanol was then added to the top of the filter and vacuum pulled through the filter until a dry cake was again obtained. The remainder of the filtered product from the stainless steel reactor was processed in the same manner and the filter cakes dried to less than 0.5% volatiles. The dried cakes were ground in a Fitz mill and passed through a 40 mesh screen to provide the amine terminated polysulfone polyether having the characteristics as shown in Table I.

TABLE I

| Analysis | |
|---|---|
| OH (meq/g) | 0.04 |
| NH2 (meq/g) | 0.41 |
| Cl (meq/g) | 0.03 |
| $T_g$DSC (°C.) | 163 |
| $T_g$RDS (°C.) | 176 |
| Viscosity at 220° C. (poise) | 8000 |
| Volatiles (%) | 0.6 |
| SEC[1]: | |
| Mn | 3330 |
| Mw | 11800 |
| Mw/Mn | 3.56 |
| Mz | 19700 |

[1]Size exclusion chromotography using polystyrene as a standard. Mn is number average; Mw is weight average and Mz is the Z average.

The bisphenol A used in this example was obtained from Dow Chemical as commericially available bisphenol A of 99.9% purity; the dichlorodiphenyl (also know as chlorophenyl-sulfone) was obtained from American Hoecht as a commercially available material of 99.9% purity; and the para-aminophenol was obtained from Chemical Dynamics of about 97-98% purity.

EXAMPLE 2

The procedures of Example 1 were generally followed but on a larger scale in a second run. Run 2 differed from Example 1 in that the potassium salts remaining after end-capping (i.e. reaction with p-aminophenolate) were filtered at a higher temperature (i.e. 60°-70° C.) and the end-capping reaction was conducted at 120? C. rather than 140° C.

The material balance estimates for Run 2 are set forth in Table II below.

The following abbreviations are used in Table II and the remainder of this Example.

DMSO means dimethylsulfoxide.
BIS A means bisphenol A.
K-BIS A means potassium salt of bisphenol A.
DCDPS means dichlorodiphenylsulfone.
KOH means potassium hydroxide.
H2O means water.
KCl means potassium chloride.
K2CO3 means potassium carbonate.
PAP means p-aminophenol.
K-PAP means potassium salt of p-aminophenol.
Cl-Olig means chlorine-terminated polyarylene polyether.
A-Olig means amine terminated polyarylene polyether.
NA2SO3 means sodium sulfite.
RXN means reaction.
Ovhd means overhead.
EVAP means evaporation.
Rx means reaction mixture.
FILTRTN means filtration.
Salts means salts filtered from reaction mixture.
Tg means glass transition temperature.
DSC means differential scanning colorimetry.
TG DSC means glass transition temperature measured by differential scanning calorimetry.
RDS means rheometric.
Tg RDS means glass transition temperature measured by rheometrics.
Pd means polydispersity which is defined as weight average molecular weight (Mw) by size exclusion chromatography divided by number average molecular weight (Mn) also by size exclusion chromatography.
$M_N$ means number average molecular weight determined by size exclusion chromotography.
$M_W$ means weight average molecular weight determined by size exclusion chromotography.
$M_Z$ means Z average molecular weight determined by size by exclusion chromotography.
$h_{220}$ means viscosity at 220° C.
Cl-XF means chlorine content by x-ray florescence.
Cl-IC means chlorine content by ion chromatography.
Cl-TITRN means chlorine content by titration.
LC means liquid chromographic analysis.
A/E means the ratio of amine hydrogen to epoxy groups in a curable or cured epoxy resin composition.

TABLE II

MATERIAL BALANCE - RUN 2

| STEP | DMSO | TOLUENE | BIS A | DCDPS | KOH | H₂O | KCl | K₂CO₃ | TOTAL |
|---|---|---|---|---|---|---|---|---|---|
| CHARGE | 575 | 135 | 117.5 | — | 55.9 | 68.2 | — | 16.4 | 968.0 |
| | | | K-BIS A | | | | | | |
| RXN REFLUX | 575 | 135 | 156.6 | — | — | 86.8 | — | 14.3 | 967.7 |
| | 210.5 taken overhead; (968 − 210.5) = 757.5 left in Rx | | | | | | | | (210.5) |
| | water conc in Rx = 0.65%; (757.5 × 0.0065) = 4.9 water left | | | | | | | | |
| | (86.1 − 4.9) = 81.2 water ovhd (210.5 − 81.2) = 129.3 solvents ovhd | | | | | | | | |
| | | 580.7 | 156.6 | — | — | 5.6 | — | 14.3 | 757.5 |
| CHARGE | — | 300 | — | 162.7 | — | — | — | — | 462.7 |
| flush | 75 | — | — | — | — | — | — | — | 75.0 |
| | | | Cl-Olig | | | | | | |
| RXN EVAP | 955.7 | 242.4 | — | — | — | 5.6 | 76.7 | 14.3 | 1295.2 |
| | 333 taken ovhd; assume 3.3 water | | | | | | | | (333.0) |
| | | 626.0 | 242.4 | — | — | 2.3 | 76.7 | 14.3 | 962.2 |
| | | | | PAP | | | | | |
| CHARGE | 120 | 100 | — | 10.9 | 5.5 | 6.5 | — | 2.0 | 244.9 |
| | | | | K-PAP | | | | | |
| RXN REFLUX | 120 | 100 | — | 14.7 | — | 8.3 | — | 1.6 | |
| | | | 10 toluene added | | | | | | 10.0 |
| | 79.2 taken ovhd (254.9 − 79.2) = 175.7 left in Rx | | | | | | | | (79.2) |
| | water conc in Rx = 0.8% (175.7 × 0.008) = 1.4 left | | | | | | | | |
| | (8.3 − 1.3) = 6.9 water ovhd (79.2 − 6.9) = 72.3 solvents ovhd | | | | | | | | |
| | | 157.7 | — | 14.7 | — | 1.4 | — | 1.6 | |
| flush | 100 | — | — | — | — | — | — | — | 100.0 |
| | | | A-Olig | | | | | | |
| RXN EVAP | 883.7 | 250 | — | — | — | 3.7 | 84.1 | 15.9 | 1237.9 |
| | 96 taken ovhd; assume 1.0 water and no toluene left | | | | | | | | (96.0) |
| | | 788.7 | 250 | — | — | 2.7 | 84.1 | 15.9 | 1141.9 |
| | A-Olig dope conc on salt free basis = 250/(788.7 + 250) = 24% | | | | | | | | |
| | 10 NA₂SO₃ added total Salts = (84.1 + 15.9 + 2.7 + 10.0) = 112.7 | | | | | | | | |
| FILTRTN | 230 Salts + dope removed in bag filters (1142 − 230) = 912 | | | | | | | | |
| | whereas 890 A-Olig dope collected in drums | | | | | | | | |
| | (230 − 113) = 117 dope in Salts | | | | | | | | |
| | 110 DMSO added to drums (890 × 0.24)/(890 + 110) = 0.214 | | | | | | | | |
| | A-Olig dope conc in drums = 21.4% | | | | | | | | |

Table III set forth below shows the ingredient additions, sampling results and times of such additions and sampling undertaken in Run 2. The results of a filtered dope sample coagulated in water rather than methanol is also shown in Table III.

TABLE III

RUN 2 ANALYSES

| Sample | Time (Hours) | Analysis | Result |
|---|---|---|---|
| | | Reflux Started at: 0:00 | |
| STEP 1 | | | |
| A-1 | 26:30 | H₂O | 0.8% |
| A-2 | 30:45 | H₂O | 0.65% |
| | | Transferred DCDPS: 32:05–32:40 | |
| STEP 2 | | | |
| B-1 | 44:00 | OH | 0.01 meq/gm |
| | | $T_g$DSC | 162.5° C. |
| B-2 | 46:00 | OH | 0.01 meq/gm |
| | | Cl-XF | 0.39 meq/gm |
| | | Cl-IC | 0.35 meq/gm |
| | | $T_g$DSC | 163° C. |
| | | $T_g$RDS | 173° C. |
| | | Viscosity at 220° C. | 3000 poise |
| | | 10.9 parts of PAP charged to glass-lined reactor | |
| STEP 3 | | | |
| C-1 | 61:00 | H₂O | 1.5% |
| C-2 | 62:30 | H₂O | 1.2% |
| C-3 | 64:00 | H₂O | 0.8% |
| C-4 | 65:00 | H₂O | 0.8% |
| | | Transferred K-PAP: 66:20 | |
| STEP 4 | | | |
| D-1 | 68:30 | OH | 0.03 meq/gm |
| | | NH₂ | 0.32 meq/gm |
| | | $T_g$DSC | 167.5° C. |
| D-2 | 69:30 | OH | 0.03 meq/gm |
| | | NH₂ | 0.32 meq/gm |
| | | $T_g$DSC | 168° C. |
| | | $T_g$RDS | 178° C. |
| | | Viscosity at 220° C. | 5800 poise |
| | | Filtration of Dope: 71:10 | |
| | | FILTERED DOPE SAMPLE COAGULATED IN H₂O: | |
| | | OH | 0.03 meq/gm |
| | | NH₂ | 0.33 meq/gm |
| | | Cl-IC | 0.04 meq/gm |
| | | $T_g$DSC | 163° C. |
| | | SEC | $M_N$ - 3900 $M_W$ - 12200 $M_Z$ - 20200 $P_d$ - 3.14 |

EXAMPLE 3

The procedures of Example 2 were generally followed in a third run and the reaction of this Run 3 was on the same scale as shown in Example 2. A slightly different heating apparatus slowed the dehydration of the p-aminophenolate product but such product was deemed to have less than 1% water by weight inasmuch as heating continued for ninety minutes after the last sample was taken.

This run demonstrated what had been learned in previous laboratory runs, namely, the molecular weight of the final product appears to increase slightly after end-capping.

Table IV below shows the estimated material balances for Run 3. The abbreviations in Table IV have the same meanings as in Example 2.

TABLE IV

MATERIAL BALANCE - RUN 3

| STEP | DMSO | TOLUENE | BIS A / K-BIS A / Cl-Olig / PAP / K-PAP / A-Olig | DCDPS | KOH | H$_2$O | KCl | K$_2$CO$_3$ | TOTAL |
|---|---|---|---|---|---|---|---|---|---|
| CHARGE | 575 | 135 | 117.5 (BIS A) | — | 55.9 | 68.6 | — | 16.4 | 968.4 |
| RXN REFLUX | 575 | 135 | 156.6 (K-BIS A) | — | — | 87.2 | — | 14.3 | 968.1 |
| | 223.3 taken overhead; (968.4 − 223.3) = 745.7 left in Rx | | | | | | | | (223.3) |
| | water conc in Rx = 1.10%; (745.7 × 0.0110) = 8.2 water left | | | | | | | | |
| | (87.2 − 8.2) = 79.0 water ovhd (223.3 − 79.0) = 144.3 solvents ovhd | | | | | | | | |
| | 565.7 | 156.6 | — | — | — | 8.2 | — | 14.3 | 744.7 |
| CHARGE | — | 300 | — | 162.7 | — | — | — | — | 462.7 |
| flush | 75 | — | — | — | — | — | — | — | 75.0 |
| RXN | | 940.7 | 242.4 (Cl-Olig) | — | — | 8.2 | 76.7 | 14.3 | 1282.5 |
| EVAP | 334.5 taken ovhd; assume 6.2 water | | | | | | | | (334.5) |
| | 612.4 | 242.4 | — | — | — | 2.0 | 76.7 | 14.3 | 948.0 |
| CHARGE | 120 | 100 | — | 10.6 (PAP) | 5.3 | 6.6 | — | 2.0 | 244.5 |
| RXN REFLUX | 120 | 100 | — | 14.3 (K-PAP) | — | 8.5 | — | 1.7 | 30.0 |
| | 30 toluene added | | | | | | | | |
| | 79.5 taken ovhd (274.5 − 79.5) = 195.0 left in Rx | | | | | | | | (79.5) |
| | water conc in Rx = 0.8% (195.0 × 0.008) = 1.6 left | | | | | | | | |
| | (8.5 − 1.6) = 6.9 water ovhd (79.5 − 6.9) = 72.6 solvents ovhd | | | | | | | | |
| | 177.4 | — | — | 14.3 | — | 1.6 | — | 1.7 | |
| flush | 100 | — | — | — | — | — | — | — | 100.0 |
| RXN | | 889.8 | 250 (A-Olig) | — | — | 3.6 | 84.1 | 16.0 | 1243.0 |
| EVAP | 100.1 taken ovhd; assume 1.0 water and no toluene left | | | | | | | | (100.1) |
| | 790.7 | 250 | — | — | — | 2.6 | 84.1 | 16.0 | 1142.9 |
| | A-Olig dope conc on salt free basis = 250/(790.7 + 250) = 24% | | | | | | | | |
| | 10 NA$_2$SO$_3$ added total Salts = (84.1 + 16.0 + 2.6 + 10.0) = 112.7 | | | | | | | | |
| FILTRTN | 809 A-Olig dope collected in drums | | | | | | | | |
| | 191 DMSO added to drums (809 × 0.24)/(809 + 191) = 0.194 | | | | | | | | |
| | A-Olig dope conc in drums = 19.4% | | | | | | | | |

Table V set forth below shows ingredient additions, sampling results and times of such additions and sampling undertaken in Run 3.

TABLE V

RUN 3 ANALYSES

| Sample | Time (Hours) | Analysis | Result |
|---|---|---|---|
| Reflux Started at: 0:00 | | | |
| STEP 1 | | | |
| A-1 | 22:10 | H$_2$O | 2.0% |
| A-2 | 24:10 | H$_2$O | 1.1% |
| A-3 | 25:20 | H$_2$O | 1.0% |
| Transferred DCDPS: 26:50-27:10 | | | |
| STEP 2 | | | |
| B-1 | 36:15 | OH | 0.01 meq/gm |
| | | T$_g$DSC | 167° C. |
| B-2 | 38:15 | OH | 0.01 meq/gm |
| | | Cl-XF | 0.36 meq/gm |
| | | Cl-IC | 0.35 meq/gm |
| | | T$_g$DSC | 167° C. |
| | | T$_g$RDS | 176° C. |
| | | Viscosity at 220° C. | 6700 poise |
| 10.6 parts of PAP charged to glass lined reactor | | | |
| STEP 3 | | | |
| C-1 | 51:45 | H$_2$O | 2.0% |
| C-2 | 53:15 | H$_2$O | 1.3% |
| C-3 | 54:15 | H$_2$O | 1.6% |
| C-4 | 56:15 | H$_2$O | 1.2% |
| C-5 | 57:15 | H$_2$O | 1.2% |
| Transferred K-PAP: 58:45 | | | |
| STEP 4 | | | |
| D-1 | 60:45 | OH | 0.04 meq/gm |
| | | NH$_2$ | 0.31 meq/gm |
| | | T$_g$DSC | 171° C. |
| D-2 | 61:45 | OH | 0.04 meq/gm |
| | | NH$_2$ | 0.31 meq/gm |
| | | Cl-IC | 0.03 meq/gm |
| | | T$_g$DSC | 172° C. |
| | | T$_g$RDS | 180° C. |
| | | Viscosity at 220° C. | 11000 poise |
| Filtration of Dope: 70:30 | | | |
| FILTERED DOPE SAMPLE COAGULATED IN H$_2$O: | | | |
| | | OH | 0.02 meq/gm |
| | | NH$_2$ | 0.30 meq/gm |
| | | Cl-XF | 0. meq/gm |
| | | T$_g$DSC | 167° C. |
| | | SEC | M$_N$ - 4420 M$_W$ - 13300 M$_Z$ - 21500 P$_d$ - 3.02 |

EXAMPLE 4

The procedures of Examples 2 and 3 were followed in a fourth run and this Run 4 was on the same scale as Runs 2 and 3.

The chlorine-terminated polyarylene polyether produced in this Run 4 had a slightly lower molecular weight than desired at this stage of the reaction. Endcapping with a slight excess of the potassium aminophenolate produced an amine-terminated polyarylene polyether with a higher molecular weight.

The material balance estimates for Run 4 appear in Table VI, below, and the timing and results of reactant addition and product analysis for this Run 4 appear in Table VII following Table VI. The abbreviations in Tables VI and VII have the same meanings as set forth in Example 2.

TABLE VI

MATERIAL BALANCE - RUN 4

| STEP | DMSO | TOLUENE | BIS A | DCDPS | KOH | H2O | KCl | K2CO3 | TOTAL |
|---|---|---|---|---|---|---|---|---|---|
| CHARGE | 575 | 135 | 117.5 | — | 55.9 | 70.4 | — | 16.4 | 970.2 |
|  |  |  | K-BIS A |  |  |  |  |  |  |
| RXN | 575 | 135 | 156.6 | — | — | 89.0 | — | 14.3 | 968.1 |
| REFLUX | 216.2 taken overhead; (970 − 216.2) = 753.8 left in Rx | | | | | | | | (216.2) |
|  | water conc in Rx = 0.60%; (753.8 × 0.006) = 4.5 water left | | | | | | | | |
|  | (89.0 − 4.5) = 84.5 water ovhd (216.2 − 84.5) = 131.7 solvents ovhd | | | | | | | | |
|  | 578.3 | | 156.6 | — | — | 4.5 | — | 14.3 | 753.8 |
| CHARGE | — | 300 | — | 162.7 | — | — | — | — | 462.7 |
| flush | 75 | — | — | — | — | — | — | — | 75.0 |
|  |  |  | Cl-Olig |  |  |  |  |  |  |
| RXN |  | 953.3 | 242.4 | — | — | 4.5 | 76.7 | 14.3 | 1291.2 |
| EVAP | 341.0 taken ovhd; assume 3.3 water | | | | | | | | (341.0) |
|  |  | 615.6 | 242.4 | — | — | 1.2 | 76.7 | 14.3 | 950.2 |
|  |  |  |  | PAP |  |  |  |  |  |
| CHARGE | 120 | 100 | — | 11.2 | 5.6 | 7.0 | — | 2.0 | 245.8 |
|  |  |  |  | K-PAP |  |  |  |  |  |
| RXN | 120 | 100 | — | 15.1 | — | 9.0 | — | 1.6 |  |
| REFLUX | 51.3 taken ovhd (245.8 − 51.3) = 194.5 left in Rx | | | | | | | | (51.3) |
|  | water conc in Rx = 0.4% (194.5 × 0.004) = 0.8 left | | | | | | | | |
|  | (9.0 − 0.8) = 8.2 water ovhd (51.3 − 8.2) = 43.1 solvents ovhd | | | | | | | | |
|  | 176.9 | — | — | 15.1 | — | 0.8 | — | 1.6 |  |
| flush | 100 | — | — | — | — | — | — | — | 100.0 |
|  |  |  | A-Olig |  |  |  |  |  |  |
| RXN |  | 892.5 | 250 | — | — | 2.0 | 84.1 | 15.9 | 1244.5 |
| EVAP | 86.5 taken ovhd; assume 1.0 water and no toluene left | | | | | | | | (100.1) |
|  |  | 807.0 | 250 | — | — | 1.0 | 84.1 | 15.9 | 1158.2 |
|  | A-Olig dope conc on salt free basis = 250/(807.0 + 250) = 23.7% | | | | | | | | |
|  | 10 NA2SO3 added total Salts = (84.1 + 15.9 + 1.0 + 10.0) = 111.0 | | | | | | | | |
| FILTRTN | 777.5 A-Olig dope collected in drums | | | | | | | | |
|  | 222.5 DMSO added to drums (777.5 × 0.237)/(777.5 + 222.5) = 0.184 | | | | | | | | |
|  | A-Olig dope conc in drums = 18.4% | | | | | | | | |

TABLE VII

RUN 4 ANALYSES

| Sample | Time (Hours) | Analysis | Result |
|---|---|---|---|
|  | Reflux Started at: 0 | | |
| STEP 1 | | | |
| A-1 | 26:30 | H2O | 1.3% |
| A-2 | 20:30 | H2O | 0.6% |
| A-3 | 29:30 | H2O | 0.6% |
|  | Transferred DCDPS: 30:30–30:42 | | |
| STEP 2 | | | |
| B-1 | 41:00 | OH | 0.01 meq/gm |
|  |  | $T_g$DSC | 162° C. |
| B-2 | 43:00 | OH | 0.01 meq/gm |
|  |  | Cl-XF | 0.44 meq/gm |
|  |  | $T_g$DSC | 159/161° C. |
|  | 11.2 parts of PAP charged to glass-lined reactor | | |
| STEP 3 | | | |
| C-1 | 54:30 | H2O | 0.3% |
| C-2 | 56:15 | H2O | 0.4% |
|  | Transferred K-PAP: 58:15 | | |
| STEP 4 | | | |
| D-1 | 61:00 | OH | 0.03 meq/gm |
|  |  | NH2 | 0.33 meq/gm |
|  |  | $T_g$DSC | 169° C. |
| D-2 | 62:00 | OH | 0.03 meq/gm |
|  |  | NH2 | 0.34 meq/gm |
| D-3 | 63:00 | $T_g$DSC | 169° C. |
|  |  | OH | 0.03 meq/gm |
|  |  | NH2 | 0.33 meq/gm |
|  |  | Cl-XF | 0.03 meq/gm |
|  |  | $T_g$DSC | 169° C. |
|  | Filtration of dope: 70:30 | | |

EXAMPLE 5

Another run, Run 5, was undertaken using the same general procedures as Runs 2, 3 and 4. Run 5, however, used slightly less dimethylsulfoxide and toluene. A chlorine-terminated polyarylene polyether was produced having a degree of polymerization of about 15. An extra amount of the potassium aminophenolate was used in end-capping and this end capping reaction resulted in a polyarylene polyether having a degree of polymerization of about 12.

Tables VIII and IX set forth below show the estimated material balances and the timing of sampling and additions during this Run 5. The abbreviations in Tables VIII and IX are the same as set forth in Example 2.

TABLE VIII

MATERIAL BALANCE - RUN 5

| STEP | DMSO | TOLUENE | BIS A | DCDPS | KOH | H2O | KCl | K2CO3 | TOTAL |
|---|---|---|---|---|---|---|---|---|---|
| CHARGE | 526 | 120 | 117.5 | — | 55.9 | 70.3 | — | 16.4 | 906.1 |
|  |  |  | K-BIS A |  |  |  |  |  |  |
| RXN | 526 | 120 | 156.6 | — | — | 88.9 | — | 14.3 | 905.8 |
| REFLUX | 181.8 taken overhead; (906 − 181.8) = 724.2 left in Rx | | | | | | | | (223.3) |
|  | water conc in Rx = 0.81%; (724.2 × 0.0081) = 5.9 water left | | | | | | | | |
|  | (88.9 − 5.9) = 83.0 water ovhd (181.8 − 83.0) = 98.8 solvents ovhd | | | | | | | | |

TABLE VIII-continued

MATERIAL BALANCE - RUN 5

| STEP | DMSO | TOLUENE | | KOH | H$_2$O | KCl | K$_2$CO$_3$ | TOTAL |
|---|---|---|---|---|---|---|---|---|
| | | 547.2 | 156.6 | — | — | 5.9 | — | 14.3 | 724.2 |
| CHARGE | — | 275 | | 162.7 | — | — | — | 437.7 |
| flush | 75 | — | | — | — | — | — | 75.0 |
| | | | Cl-Olig | | | | | |
| RXN | | 897.2 | 242.4 | — | — | 5.9 | 76.7 | 14.3 | 1236.9 |
| EVAP | 327.0 taken ovhd; assume 3.8 water | | | | | | | (327.0) |
| | | 574.0 | 242.4 | | — | 2.1 | 76.7 | 14.3 | 909.9 |
| | | | | PAP | | | | | |
| CHARGE | 120 | 100 | — | 8.1 | 4.1 | 5.2 | — | 2.0 | 239.4 |
| | | | | K-PAP | | | | | |
| RXN | 120 | 100 | — | 10.9 | — | 6.8 | — | 1.7 | |
| REFLUX | 49.9 taken ovhd (239.4 − 49.9) = 189.5 left in Rx | | | | | | | (49.9) |
| | water conc in Rx = 0.9% 189.5 × 0.009) = 1.7 left | | | | | | | |
| | (6.8 − 1.7) = 5.1 water ovhd (49.9 − 5.1) = 44.8 solvents ovhd | | | | | | | |
| | | 175.2 | — | 10.9 | — | 1.7 | — | 1.7 | |
| flush | 100 | — | | — | — | — | — | 100.0 |
| | | | A-Olig | | | | | |
| RXN | | 849.2 | 250 | — | — | 3.8 | 84.1 | 16.0 | ****** |
| EVAP | 95.6 taken ovhd; assume 1.0 water and no toluene left | | | | | | | (100.1) |
| | | 754.6 | 250 | — | — | 2.8 | 84.1 | 15.9 | ****** |
| | A-Olig dope conc on salt free basis = 250/(754.6 + 250) = 24.9% | | | | | | | |
| | 10 NA$_2$SO$_3$ added total Salts = (84.1 + 15.9 + 2.8 + 10.0) = 112.8 | | | | | | | |
| FILTRTN | 703 A-Olig dope collected in drums | | | | | | | |
| | 297 DMSO added to drums (703 × 0.249)/(703 + 297) = 0.175 | | | | | | | |
| | A-Olig dope conc in drums = 17.5% | | | | | | | |

TABLE IX

RUN 5 ANALYSES

| Sample | Time (Hours) | Analysis | Result |
|---|---|---|---|
| Reflux Started at: 6:00 | | | |
| STEP 1 | | | |
| A-1 | 19:30 | H$_2$O | 1.6% |
| A-2 | 21:30 | H$_2$O | 1.3% |
| A-3 | 25:30 | H$_2$O | 1.3% |
| A-4 | 27:30 | H$_2$O | 0.8% |
| Transferred DCDPS: 30:25–30:40 | | | |
| STEP 2 | | | |
| B-1 | 39:30 | OH | 0.01 meq/gm |
| | | Cl-XF | 0.29 meq/gm |
| | | T$_g$DSC | 168.5° C. |
| B-2 | 41:30 | OH | 0.01 meq/gm |
| | | Cl | 0.28 meq/gm |
| | | T$_g$DSC | 168.5° C. |
| 8.1 parts of PAP charged to glass-lined reactor | | | |
| STEP 3 | | | |
| C-1 | 49:30 | H$_2$O | 3.9% |
| C-2 | 51:30 | H$_2$O | 1.7% |
| C-3 | 53:00 | H$_2$O | 0.9% |
| Transferred K-PAP: 54:10 | | | |
| STEP 4 | | | |
| D-1 | 57:00 | OH | 0.05 meq/gm |
| | | NH$_2$ | 0.27 meq/gm |
| | | Cl-XF | 0.04 meq/gm |
| | | T$_g$DSC | 172.5° C. |
| D-2 | 58:10 | OH | 0.06 meq/gm |
| | | NH$_2$ | 0.28 meq/gm |
| | | Cl-XF | 0.03 meq/gm |
| | | T$_g$DSC | 171.5° C. |
| Filtration of Dope: 67:30 | | | |

EXAMPLE 6

This example illustrates the recovery of amine-terminated polyarylene polyether from the potassium salts filtered from the polyarylene polyether dope at the end of the end-capping reaction. The results of analyses of such recovered product (designated by the letter S next to the Run number) together with the results of analyses of the product of the main batches are shown in Table XI, below.

The amine-terminated polyarylene polyether contained in the filtered KCl salts was recovered by feeding the dope-wet salts into deionized water containing Na$_2$SO$_3$. This was usually done in two batches per run. The water-coagulated amine-terminated polyarylene polyether was then filtered and washed using the Crock filter and then dried.

Generally the amine-terminated polyarylene polyether recovered from the KCl salts constituted about 10–15% of the total (theoretical) amine-terminated polyarylene polyether. This material, since it is coagulated in water tends to have a higher amine termination and lower T$_g$ than the main methanol-coagulated batches.

The amine-terminated polyarylene polyether recovered from the KCl salts for Runs 2 and 3 were blended together. The properties of the blended product are that they have a higher NH$_2$ level, a lower T$_g$ and lower M$_N$ and broader molecular weight distribution than the main batches. The product was an amine-terminated polyarylene polyether having a dp of 9 versus 10.5 to 11.5 for the main batches.

The amine-terminated polyarylene polyether recovered from the KCl salts of Run 4 also showed similar results as shown in Table XI. The KCl salts recovered amine-terminated polyarylene polyethers from Run 5 are somewhat lower in amine and higher in chlorine endgroups than the main batch. The high T$_g$ is reflective of the higher molecular weight of the run.

A comparison of the amine-terminated polyethers from each of the runs demonstrates the consistency which is achieved in accordance with this invention.

TABLE XI

FINAL PRODUCT RESULTS

| Batch | Run 2 | Run 3 | *Runs 2/3S | Run 4 | Runs-4S | Run 5 | Runs-5S | **Combined Runs 2-5S |
|---|---|---|---|---|---|---|---|---|
| OH (meq/g) | 0.02 | 0.03 | 0.04 | 0.02 | 0.04 | 0.06 | 0.05 | 0.05 |
| NH$_2$ (meq/g) | 0.33 | 0.31 | 0.36 | 0.35 | 0.38 | 0.30 | 0.26 | 0.36 |

TABLE XI-continued

FINAL PRODUCT RESULTS

| Batch | Run 2 | Run 3 | *Runs 2/3S | Run 4 | Runs-4S | Run 5 | Runs-5S | **Combined Runs 2-5S |
|---|---|---|---|---|---|---|---|---|
| Cl (meq/g) | 0.04 | 0.02 | 0.04 | 0.03 | 0.03 | 0.02 | 0.13 | 0.06 |
| % Volatiles | (0.5) | (0.5) | 1.5 | (0.5) | | | | 0.5 |
| % DMSO | 0.3 | 0.1 | 0.7 | 0.18 | | | | 0.2 |
| $T_g$DSC (°C.) | 166 | 168 | 164 | 167 | 163 | 170.5 | 169 | 166 |
| $T_g$RDS (°C.) | 177 | 179 | 174 | 176 | | 180 | | 176 |
| $h_{220}$ (poise) | 4600 | 8500 | 13000 | 12000 | | 20000 | | 7000 |
| SEC | | | | | | | | |
| $M_N$ | 3960 | 4700 | 5120 | 4910 | | 5020 | | 4340 |
| $M_W$ | 12700 | 14000 | 12900 | 14000 | | 14400 | | 13700 |
| $M_Z$ | 20500 | 22600 | 21400 | 23100 | | 23600 | | 23000 |
| $P_d$ | 2.70 | 2.73 | 3.15 | 2.85 | | 2.88 | | 3.16 |

*Amine-terminated polyarylene polyether from Runs 2 and 3 Salts and combined together.
**Amine-terminated polyarylene polyether from Runs 2 - t Salts and combined together.

EXAMPLE 7

Part A

To a 12 liter flask having a nitrogen inlet and equipped with a thermometer, stirrer, condenser and Dean-Stark trap were added under nitrogen 1333 grams (5.8 moles) of bisphenol A, 1420 grams (11.3 moles) of a 44.8% aqueous potassium hydroxide solution and 160 grams of water. The contents of the flask were heated to 60° C. and maintained thereat for ½ hour, at which time a homogeneous mixture was obtained. Next 960 grams of toluene, 200 grams of potassium carbonate and 1900 grams of dimethylsulfoxide were added to the flask and the contents were heated to the reflux temperature (about 120° C.) to remove water as a water-toluene-dimethylsulfoxide azeotrope, 1200 grams of azeotrope being collected. The contents of the flask were cooled to 105° C., a solution of 1887 grams (6.57 moles) of 4,4'-dichlorodiphenylsulfone in 2000 grams of dimethylsulfoxide and 160 grams of toluene was added and the resulting mixture was heated to 160° C. and maintained at 160° C. for 16 hours, toluene distillate being removed, as formed. The reaction mixture was cooled to 120° C.

In a second flask a mixture of 159.4 grams (1.46 moles) of p-aminophenol, 177.5 grams (1.42 moles) of 44.8% aqueous potassium hydroxide solution, 60 grams of water, 240 grams of toluene and 900 grams of dimethylsulfoxide was dehydrated at 120° C. for 4 hours. The dehydrated mixture was transferred to the 12 liter flask under nitrogen and the resulting mixture was heated to 140° C. and maintained at 140° C. for 2 hours, following which time the reaction mixture was cooled to room temperature. The cooled mixture was next filtered to remove the solid inorganic salts and the filtrate was washed with dimethylsulfoxide. The washed filtrate (12 liters) was poured slowly into 48 liters of methanol to precipitate the amine-terminated polyarylene polyether as a solid product. The precipitate was then washed with water until free of chloride ions and the washed product was dried under vacuum at 100° C. to give a yield of 94.7% amounting to 2746 grams of the polyarylene polyether having a melt viscosity (220° C.) of 11,000 poises, a molecular weight ($M_n$) of 4050 by size exclusion chromatography (SEC) and a glass transition temperature, Tg, of 175° C. End group analyses (OH=0.07 meq/gram and NH$_2$=0.28 meq/gram) indicated that greater than 74% of the end groups of the polyarylene polyether were amine terminated.

EXAMPLE 8

Part A

The procedure of Example 7 was repeated except that 1500 grams (6.57 moles) of bisphenol A and 2096.5 grams (7.3 moles) of 4,4'-dichlorodiphenylsulfone were used and m-aminophenol was substituted for p-aminophenol. The amine-terminated polyarylene polyether (2372 grams; 74% yield) had a Tg of 173° C., a melt viscosity at 220° C. of 3000 poises and a molecular weight ($M_N$) of 5100 end group analysis. End group analyses (OH=0.11 meq/g and NH$_2$=0.28 meq/g) indicated that about 72% of the end groups of the polyether were amine terminated.

EXAMPLE 9

To a reaction flask equipped with thermometer, stirrer, Dean-Stark trap and condenser were added under nitrogen 71.3 grams (0.31 mole) of bisphenol A, 50.5 grams (0.32 mole) of 2,7-dihydroxynaphthalene, 150 grams of a 45% aqueous potassium hydroxide solution and 60 grams of water. Agitation was commenced and the contents of the flask were heated to 60° C. for ½ hour, at which time a homogeneous mixture was obtained.

Next 174 grams of toluene and 25 grams of potassium carbonate were added to the reaction flask and the contents were heated at 90° C. until a solid mass was formed. Next 220 grams of dimethylsulfoxide were added to the reaction flask and the contents heated to the boil to remove water as a water-toluene-dimethylsulfoxide azeotrope. The reaction mass was cooled to 80° C. and a solution of 201.7 grams (0.7 mole) of 4,4'-dichlorodiphenylsulfone in 220 grams of dimethylsulfoxide and 45 grams of toluene was added to the flask. The reaction mass was heated to 160° C. and maintained thereat for 16 hours, toluene being distilled from the mass and removed therefrom. The reaction mass was then cooled to 100° C.

Meanwhile, in a second flask a mixture of 17.03 grams (0.16 mole) of m-aminophenol, 2 grams of potassium carbonate, 19.3 grams of 45% aqueous potassium hydroxide solution, 20 grams of water and 110 grams of dimethylsulfoxide was dehydrated by heating at 120° C. for 4 hours. The dehydrated mixture was transferred to the reaction flask under nitrogen and the resulting mixture heated for 2 hours at 140° C., after which time the reaction mixture was cooled to room temperature and filtered to remove solid inorganic salts. The filtrate was washed with dimethylsulfoxide and the washed filtrate was slowly poured into 1 liter of methanol to precipitate the amine-terminated polyarylene polyether. The product was washed free of chloride ions with water and then dried under vacuum at 100° C. The product (192 grams, 66% yield) had a Tg of 186° C., and a molecular weight of about 5300 by end group analysis. End group analyses (OH=0.08 meq/g, $NH_2$=0.31 meq/g and Cl=less than 0.03 meq/g), also indicated that about 80% of the end groups of the polyether were amine terminated.

EXAMPLE 10

The procedure of Example 9 was repeated except that 50 grams (0.27 mole) of biphenol was substituted for the 50.5 grams of 2,7-dihydroxynaphthalene and 63.1 grams (0.27 mole) of bisphenol A, 173.5 grams (0.60 mole) of 4,4'-dichlorodiphenylsulfone and 15 grams (0.14 mole) of m-aminophenol were used. The oligomeric product (231 grams, 90% yield) was an amine-terminated polyarylene polyether having a Tg of 181° C., a melt viscosity (220° C.) of 18,000 poises and a molecular weight of 3000 by end group analysis. End group analyses (OH=0.07 meq/g and $NH_2$=0.6 meq/g) also indicated that about 89% of the end groups were amine.

EXAMPLE 11

Part A

A first reactor equipped with temperature and pressure indicators, agitator, overhead condenser, separator and nitrogen purge was charged with 575 parts of dimethylsulfoxide and 135 parts of toluene. The charge was sparged with nitrogen for 2 hours, following which time 117.5 parts of bisphenol A and 16.4 parts of potassium carbonate were added to the reactor with agitation. The reactor was inerted with nitrogen and the contents of the reactor were heated to 40° C. Next, 124.2 parts of a nitrogen-sparged, 45.13% aqueous potassium hydroxide solution were added to the reactor and the contents were heated at the reflux temperature (a temperature range of 116°–140° C.) to remove water. During refluxing the solvent system formed two layers in the separator. The upper layer (toluene rich) was returned to the reactor and the lower aqueous layer was drained from the system. Refluxing was terminated when the reaction mixture contained 0.9% water, 246 parts of water and solvent having been removed, and the reaction mixture was cooled to 118° C.

To a second reactor containing 300 parts of nitrogen-sparged toluene were added 162.7 parts of 4,4'-dichlorodiphenylsulfone, the reactor was inerted and the contents were heated to 100° C. Next the contents of this reactor were transferred to the first reactor and the resulting mixture was heated to 160° C. and maintained at that temperature for 14 hours, during which time toluene distillate was removed, as formed. The reaction mixture was then cooled to 110° C.

A third reactor was charged with 120 parts of dimethylsulfoxide and 100 parts of toluene and sparged with nitrogen for 10 hours. Next 11.2 parts of p-aminophenol and 2 parts of potassium carbonate were added to the reactor, the reactor was inerted with nitrogen, and 12.4 parts of nitrogen-sparged 45.13% aqueous potassium hydroxide solution were added to the reactor. The contents of the reactor were heated to the reflux temperature (about 120° C.) and maintained at reflux to remove water, 59 parts of water and solvent being removed. The dehydrated reaction mixture (containing 0.94% water) was cooled to 110° C. and transferred to the first reactor, and the resulting mixture was heated to 140° C. and maintained at 140° C for 4.5 hours, following which time the reaction mixture was cooled to 130° C. Vacuum was next applied to remove 75 parts of solvent (primarily toluene) from the system and the resulting mixture was cooled to 60° C. The cooled mixture was filtered to remove the solid inorganic salts, the reactor and filter cake were rinsed with dimethylsulfoxide, and the filtrate and rinsings were collected and diluted to about 25% total solids with dimethylsulfoxide. A portion (about 100 parts) of the filtrate was poured slowly into a vessel containing a mixture of 350 parts of methanol and 20 parts of a 20% aqueous solution of sodium sulfite to precipitate the amine-terminated polyarylene polyether as a solid product, the contents of the vessel were agitated for 0.5 hour and the contents were discharged from the vessel onto a filter. Remaining portions of the filtrate were treated in the same manner until all of the product was collected on the filter. The filter cake was first washed with water until free of chloride ions and then with methanol and the washed product was dried under vacuum at 100° C. The amine-terminated polyarylene polyether had a melt viscosity (220° C.) of 6200 poises, a molecular weight ($M_N$) of 4540 by size exclusion chromatography and a glass transition temperature, Tg, of 175° C. End group analyses (OH=0.02 meq/gram; $NH_2$=0.36 meq/gram; and Cl=less than 0.03 meq/gram) indicated that about 90% of the end groups of the polyether were amine terminated.

Part B

A vessel equipped with agitator and heating means was charged with 32.65 parts of triglycidyl p-aminophenol (CG 0510) and 8.16 parts of butanediol diglycidyl ether (Araldite RD-2 marketed by Ciga-Geigy Corp.) and the charge was heated to 100° C. with agitation. Next 37.0 parts of the amine-terminated polyarylene polyether of Part A, above, were added to the vessel and the resulting charge was maintained at 100° C. and agitated for 1.5 hours, following which time 22.19 parts of 4,4'-diaminodiphenylsulfone were added to the charge and agitation was continued for 10 minutes.

The charge was transferred to an aluminum pan and cooled to room temperature. The pan containing the charge was placed in a vacuum oven and heated to 140° C. at a heating rate of 2° C./minute. When the temperature reached 100° C., vacuum was applied to remove entrapped air. When the temperature reached 140° C., the vacuum was released and the contents of the pan were transferred to a preheated (177° C.) aluminum mold (cavity dimensions of ⅛"×6"×7"). The mixture was cured in the mold for 4 hours at 177° C. and then cooled to room temperature at a nominal rate of 1° C./minute. The resulting cured resin was a thermoset having two glass transition temperatures, Tg of 190° C. and Tg of 229° C. Mechanical property measurements gave a calculated critical stress intensity factor, $K_{IC}$, of 1.44±0.02 MPam$^{\frac{1}{2}}$ (3 samples), G' ( ) of 1.2 GPa and cohesive fracture energy, $G_{IC}$, of 610±17 joules/meter$^2$. Transmission electron microscopy of $RuO_4$-stained microtomed sections of the cured resin indicated a phase separated morphology consisting of a polysulfone rich continuous phase and a discontinuous phase consisting of elliptical and circular shaped domains of various sizes and having maximum dimensions in the range of 0.5 micron to 2 microns. The discontinuous phase occupied about 50% of the area represented by the sections.

EXAMPLE 12

Part A

A first reactor equipped with temperature and pressure indicators, agitator, overhead condenser, separator and nitrogen purge was charged with 425 parts of dimethylsulfoxide and 100 parts of toluene. The charge was sparged with nitrogen for 2 hours, following which time 70.7 parts of bisphenol A were added to the reactor with agitation. The reactor was inerted with nitrogen and the contents of the reactor were heated to 40° C. Next, 75.7 parts of a nitrogen-sparged, 44.56% aqueous potassium hydroxide solution and 22 parts of 45% aqueous potassium carbonate were added to the reactor and the contents were heated at the reflux temperature (a temperature range of 107°–142° C.) to remove water. During refluxing the solvent system formed two layers in the separator. The upper layer (toluene rich) was returned to the reactor and the lower aqueous layer was drained from the system. Refluxing was terminated when the reaction mixture contained 1.2% water, 230 parts of water and solvent having been removed, and the reaction mixture was cooled to 118° C.

To a second reactor containing 200 parts of nitrogen-sparged toluene were added 97.9 parts of 4,4'-dichlorodiphenylsulfone, the reactor was inerted and the contents were heated to 100° C. Next the contents of this reactor were transferred to the first reactor and the resulting mixture was heated to 160° C. and maintained at that temperature for 10 hours, during which time toluene distillate was removed, as formed. The reaction mixture was then cooled to 110° C.

A third reactor was charged with 120 parts of dimethylsulfoxide and 100 parts of toluene and sparged with nitrogen for 4 hours. Next 6.8 parts of p-aminophenol and 2 parts of potassium carbonate were added to the reactor, the reactor was inerted with nitrogen, and 7.6 parts of nitrogen-sparged 44.56% aqueous potassium hydroxide solution were added to the reactor. The contents of the reactor were heated to the reflux temperature (about 120° C.) and maintained at reflux to remove water, 36 parts of water and solvent being removed. The dehydrated reaction mixture (containing 0.94% water) was cooled to 110° C. and transferred to the first reactor, and the resulting mixture was heated to 140° C. and maintained at 140° C. for 6 hours, following which time the reaction mixture was cooled to 130° C. Vacuum was next applied to remove 76 parts of solvent (primarily toluene) from the system and the resulting mixture was cooled to 40° C. The cooled mixture was filtered to remove the solid inorganic salts, the reactor and filter cake were rinsed with dimethylsulfoxide, and the filtrate and rinsings were collected. A portion (about 100 parts) of the filtrate was poured slowly into a vessel containing a mixture of 350 parts of methanol, 4 parts of sodium sulfite and 2 parts of sodium hydroxide to precipitate the amine-terminated polyarylene polyether as a solid product, the contents of the vessel were agitated for 0.5 hour and the contents were discharged from the vessel onto a filter. Remaining portions of the filtrate were treated in the same manner until all of the product was collected on the filter. The filter cake was first washed with water until free of chloride ions and then with methanol and the washed product was dried under vacuum at 100° C. The polyarylene polyether product had a melt viscosity (220° C. of 1500 poises, a molecular weight ($M_N$) of 2530 by size exclusion chromatography and a glass transition temperature, Tg, of 172° C. End group analyses (OH=0.07 meq/gram; $NH_2$=0.39 meq/gram; and Cl=0.07 meq/gram) indicated that about 73% of the end groups of the polyether were amine terminated.

Part B

A vessel equipped with agitator was charged with 100 parts of resorcinol diglycidyl ether (Heloxy 69) and the charge was heated to 100° C. Next 100 parts of the polyarylene polyether product of Part A, above, was added to the vessel and the charge was maintained at 100° C. with agitation for 2 hours. The resulting reaction product was cooled to 75° C. and washed repeatedly with acetone, then methanol, again with acetone and finally with methanol and the washed product was dried at 50° C. under vacuum. End group analyses for epoxide groups (0.97 meq/gram), tertiary amine groups (0.12 meq/gram), total amine groups (0.26 meq/gram) and hydroxyl groups (0.06 meq/gram) indicated that at least 46% of the end groups of the polyether were epoxide terminated.

Part C

The procedure of Part B, above, was repeated except that a charge containing 38.7 parts of resorcinol diglycidyl ether and 40 parts of the amine-terminated polyarylene polyether product of Part A, above, was heated to 100° C. and agitated for 1.5 hours, 21.3 parts of 4,4'-diaminodiphenylsulfone were added to the charge and agitation was continued for 10 minutes. The vessel was then placed in a vacuum oven at 150° C. to remove entrapped air, the mixture was poured into a preheated (177° C.) mold and the mixture was cured in the mold for 2 hours at 177° C. followed by 2 hours at 200° C. under vacuum. The resulting cured resin was a thermoset having calculated stress intensity factor, $K_{IC}$ of $1.16 + 0.02$ MPam$^{\frac{1}{2}}$.

What we claim and desire to protect by Letter Patent is:

1. In a process of processing plyarylene polyethers by reacting the double salt of a dihydroxy phenol with a molar excess of dihalobenzenoid compound in which the halogen is attached directly to ring carbon atoms at a temperature in a range between 100° C. and 200° C. in a liquid medium comprising a polar solvent and an azeotrope former and then reacting the resultant oligomer with the salt of a hydroxy aromatic amine to provide an amine terminated polyarylene polyether, an improvement which provides an amine terminated polyarylene polyether with a select degree of polymerization, between 6 and 15, and a ratio between weight average and number averge molecular weight between about 2 and 4, said improvement comprising:

(a) providing a dihydroxy phenol, a strong alkali metal base, a weak alkali metal base comprising a carbonate or bicarbonate, a polar solvent, and an azeotrope former in a first reactor, said dihydroxy phenol and said strong alkali metal base being at a molar ratio between 1:1.50 and 1:1.98 and there being sufficient alkali metal weak base to provide a total of at least one equilvalent of alkali metal in the combination of said strong and weak bases for each equivalent of hydroxyl in said dihydroxy phenol, the molar amount of said weak alkali metal base being not greater than about 50% of the molar amount of said strong alkali metal base;

(b) maintaining the contents of said first reactor at a temperature in a range sufficient for dehydration of said dihydroxy phenol and formation of a double salt of said dihydroxy phenol, said dehydration continuing with water removal until there is less than about 1% by weight water in said first reactor;

(c) combining said dihalobenzenoid compound and said double salt of (b) in said first or a different reactor at a molar ratio between 1.1.67:1 and 1.067:1 dihalobenzenoid compound to double salt, the combination of this step (c) being in the presence of a polar solvent;

(d) maintaining the contents of the reactor in step (c) at a temperature sufficient to provide a halogen-terminated polyarylene polyether with a select degree of polymerization and ratio between weight average and number average molecular weight;

(e) providing a hydroxy aromatic amine, a strong alkali metal base, a weak alkali metal base, a polar solvent and an azeotrope former in a reactor, said hydroxy aromatic amine and said strong base being at a molar ratio between 1:0.50 and 1:0.98 hydroxy aromatic amine to strong base and there being sufficient weak alkali metal base to provide a total of at least one equivalent of alkali metal in the combination of said strong and weak bases for each equivalent of hydroxy in said hydroxy aromatic amine;

(f) maintaining the contents of said reactor of (e) at a temperature in a range sufficient for dehydration of said hydroxy aromatic amine and formation of an alkali metal salt of said hydroxy aromatic amine, said dehydration continuing with water removal until there is less than about 3% water remaining in the contents of said reactor of this step (f);

(g) combining said alkali metal salt of (f) and said halogen-terminated polyarylene polyether of (d) in said reactor of (f) or (d) or a differnet reactor either in an equivalent ratio of 1:1 between halogen of said halogen-terminated polyether and said alkai metal salt of (f) or a slight excess of said alkali metal salt of (f) in the event a molecular weight reduction is desired;

(h) maintaining the contents of said reactor of (g) at a temperature sufficient to cause displacement of halogen in said halogen-terminated plyarylene polyether and provide said amine-terminated polyarylene polyether with said select degree of polymerization and ratio between weight average and number average molecular weight;

(i) separating said amine-terminated polyarylene polyether from the remainder of the contents of said reactor of (h).

2. The process in accordance with claim 1, wherein said molar ratio between dihydroxy phenol and alkali metal strong base is between about 1:1.90 and 1:1.98.

3. The process in accordance with claim wherein said strong and weak alkali metal bases in step (a) are potassium hydroxide and potassium carbonate, respectively.

4. The process in accordance with claim 3, wherein said molar ratio between said hydroxy aromatic compound and said strong alkali metal base is between about 1:0.90 and 1:0.98.

5. The process in accordance with claim 4, wherein said strong and weak bases in step (e) are potassium hydroxide and potassium carbonate, respectively.

6. The process in accordance with claim 5, wherein said dihydroxy phenol material comprises a combination dihydroxy phenol material.

7. The process in accordance with claim 5, wherein said dihydroxy phenol comprises bisphenol A.

8. The process in accordance with claim 5, wherein said dihydroxy phenol is selected from bisphenol A and biphenol.

9. The process in accordance with claim 5, wherein the halogen in said dihalobenzenoid is chlorine.

10. The process in accordance with claim 9, wherein said dihalobenzenoid compound comprises 4,4'-dichlorodiphenylsulfone.

11. The process in accordance with claim 10, wherein said molar ratio between dihalobenzenoid and dihydroxy phenol is 1.10:1.00.

12. The process in accordance with claim 1, wherein said amine-terminated polyarylene polyether has a degree of polymerization of between 8 and 12.

13. In a method of producing polyarylene polyethers by reacting a dihalobenzenoid compound in which halogen is attached directly to a ring carbon atom and a dihydroxy phenol at a temperature in a range between 100° and 200° C. and in the presence of a polar solvent, the improvement which provides an amine-terminated polyarylene polyether with a select degree of polymerization, between 6 and 15, and a ratio between weight average and number average molecular weight between about 2 and 4, said improvement comprising:

(a) providing a dihydroxy phenol, a strong alkali metal base, a weak alkali metal base comprising a carbonate, a polar solvent, an azeotrope former and optionally water in a first reactor, said dihydroxy phenol and said strong alkali metal base being at a molar ratio between 1:1.50 and 1:1.98 and there being sufficient alkali metal weak base to provide a total of at least one equivalent of alkali metal in the combination of said strong and weak bases for each equivalent of hydroxy in said dihydroxy phenol, the molar amount of said weak alkali metal base not being greater than about 50% of the molar amount of said strong alkali metal base;

(b) maintaining the contents of said first reactor at a temperature in a range sufficient for dehydration of said dihydroxy phenol and formation of a double salt of said dihydroxy phenol, said dehydration continuing until there is less than about 1% by. weight water in said first reactor;

(c) combining said dihalobenzenoid compound and said double salt of (b) in said first or a different reactor at a molar ratio between 1.167:1 and 1.067:1 dihalobenzenoid compound to double salt, the combination of this step (c) being in the presence of a polar solvent;

(d) maintaining the contents of the reactor in step (c) at a temperature and for a time sufficient to provide a halogen-terminated polyarylene polyether with said select degree of polymerization and ratio between weight average and number average molecular weight;

(e) providing a hydroxy aromatic amine, a strong alkali metal base, a weak alkali metal base, a polar solvent, an azeotrope former and optionally water in a reactor, said dihydroxy aromatic amine and said strong base being at a molar ratio between 1:0.50 and 1:0.98 and there being sufficient weak alkali metal base to provide a total of at least one equivalent of alkali metal in the combination of said strong and weak bases for each equivalent of hydroxyl in said hydroxy aromatic amine;

(f) maintaining the contents of said reactor of (e) at a temperature in a range sufficient for dehydration of said hydroxy aromatic amine and formation of an alkali metal salt of said hydroxy aromatic amine, said dehydration continuing with water removal until there is less than about 3% water remaining in the contents of said reactor of the step (f);

(g) combining said alkali metal salt of (f) and said halogen-terminated polyarylene polyether of (d) in said reactor of (f) or (d) or a different reactor either in an equivalent ratio of 1:1 between halogen of said halogen-terminated polyether and hydroxyl of said alkali metal salt of (f) or a slight excess of said alkali metal salt in the event a molecular weight reduction is desired;

(h) maintaining the contents of said reactor of (g) at a temperature sufficient to cause displacement of halogen in said halogen-termninated polyarylene polyether and provide an amine-terminated polyarylene polyether with a select degree of polymerization and ratio between weight average and number average molecular weights;

(i) isolating said amine-terminated polyarylene polyether.

14. The process in accordance with claim 13, wherein said dihydroxy phenol comprises bisphenol A.

15. The process in accordance with claim 14, wherein the halogen in said dihalobenzenoid compound comprises chlorine.

16. The process in accoraance with claim 15, wherein said strong and weak alkali metal bases in step (a) are potassium hydroxide and potassium carbonate respectively.

17. The process in accordance with claim 16, wherein the molar ratio between dihydroxy phenol and strong alkali metal base is between 1:1.90 and 1:1.98.

18. The process in accordance with claim 17, wherein the molar ratio between hydroxy aromatic amine and alkali metal strong base is between 1:0.90 and 1:0.98.

19. The process in accordance with claim 18, wherein said hydroxy aromatic amine comprises an aminophenol.

20. The process in accordance with claim 19 wherein said dihalobenzenoid compound comprises 4,4'-dichlorodiphenylsulfone. sulfone.

21. The process in accordance with claim 20, wherein said molar ratio of said dihalobenzenoid compound and said dihydroxy phenol is between 1:1.08 and 1:1.12.

22. The process in accordance with claim 21, wherein said polar solvent comprises dimethylsulfoxide and said azeotrope former comprises toluene.

23. The process in accordance with claim 22, wherein said amine-terminated polyarylene polyether is coagulated in water.

24. An amine-terminated polyarylene polyether having the formula:

wherein O is oxygen; n is between 6 and 15; X is halogen, hydroxyl, or O—R(NH$_2$)$_m$ where m is 1 or 2; Y is QX or hydrogen; Q is the residuum of a dihalobenzenoid compound having two replaceable halogens which are attached directly to ring carbon atoms; D is the residuum of a dihydroxy phenol; R is a di or trivalent aromatic group having up to four aromatic nuclei; at least about 70% of the total of said X and Y groups comprises —NH$_2$ and at least about 5% of said X and Y groups comprise hydroxyl and halogen; said amine-terminated polyarylene polyether having a weight average molecular weight that is between 2.0 and 3.6 times its number average molecular weight.

25. The polyether in accordance with claim 24 wherein at least about 75% of said X and Y groups comprises —NH$_2$.

26. The polyether in accordance with claim 25, wherein Q is selected from residuum of dichlorodiphenyl sulfones, dichlorodiphenyl ketones and combinations thereof.

27. The polyether in accordance with claim 26, wherein D is selected from residuum of one or more dihydroxy phenol materials.

28. The polyether in accordance with claim 27, wherein said dihydroxy phenol material is selected from bisphenol A, biphenol, and dihyroxy naphthalenes and combinations thereof.

29. The polyether in accordance with claim 24, wherein Q is the residuum of 4,4'-dichlorodiphenyl sulfone.

30. The polyether in accordance with claim 29, wherein D is the residuum of bisphenol A.

31. The polyether in accordance with claim 30, wherein n is between 8 and 12.

32. The polyether in accordance with claim 31, wherein R is selected from 1,3 - or 1,4-phenylene and 1,3- and 1,4-phenylene.

33. An amine-terminated polyarylene polyether having the formula:

wherein O is oxygen; n is between 8 and 12; X is halogen, hydroxyl, or O—R(NH$_2$)$_m$ where m is 1 or 2; Y is QX or hydrogen; Q is the residuum of a dihalodiphenylsulfone having two replaceable halogen which are attached directly to ring carbon atoms; D is the residuum of bisphenol A; R is a phenylene group having up to four aromatic nuclei; at least about 80% of the total of said X and Y groups comprises —NH$_2$ and at least about 5% of said X and Y groups comprise hydroxyl and halogen; said amine-terminated polyarylene polyether having a weight average molecular weight that is between 2.0 and 3.6 times its number average molecular weight and being made by a process comprising reacting a dihalodiphenyl sulfone and bisphenol A at a molar ratio of about 1.1:1.0.

* * * * *

UNITED STATES PATENT AND TRADEMARK OFFICE
CERTIFICATE OF CORRECTION

PATENT NO. : 4,789,722
DATED : DECEMBER 6, 1988
INVENTOR(S) : JABLONER & NGUYEN

It is certified that error appears in the above-identified patent and that said Letters Patent is hereby corrected as shown below:

[54] The Title:
"Polyarylene Polyether Made Using Mixed Base System"

should read:

-- Low Dp Polyarylene Polyethers Made Using Mixed Base Systems--

[56] References Cited:
"4,000,499   8/1977   Kaufman...................260/61"

should be deleted

[56] References Cited:
"4,000,499   8/1983   Colon....................528/210"

should read:

--4,400,499   8/1983   Colon....................528/210--

UNITED STATES PATENT AND TRADEMARK OFFICE
CERTIFICATE OF CORRECTION

PATENT NO. : 4,789,722

DATED : DECEMBER 6, 1988

INVENTOR(S) : JABLONER & NGUYEN

It is certified that error appears in the above-identified patent and that said Letters Patent is hereby corrected as shown below:

Column 1, Line 1

"Polyarylene Polyether Made Using Mixed Base System"

should read:

--Low Dp Polyarylene Polyethers Made Using Mixed Base Systems--

Column 6, Line 14

"hydooxy" should read --hydroxy--

Column 9, Line 66

"commericially" should read --commercially--

Column 9, Line 67

"know" should read --known--

UNITED STATES PATENT AND TRADEMARK OFFICE
CERTIFICATE OF CORRECTION

PATENT NO. : 4,789,722

DATED : DECEMBER 6, 1988

INVENTOR(S) : JABLONER & NGUYEN

It is certified that error appears in the above-identified patent and that said Letters Patent is hereby corrected as shown below:

Column 10, Line 13

"120?C" should read --120°C--

Column 10, Line 59

"by size by exclusion" should read --by size exclusion--

Column 16, Line 27

"1244.5" should read --1244.3--

Column 18, Line 29

"witn" should read --with--

Column 24, Line 2

"(220°C" should read --(220°C)--

UNITED STATES PATENT AND TRADEMARK OFFICE
CERTIFICATE OF CORRECTION

PATENT NO. : 4,789,722

DATED : DECEMBER 6, 1988

INVENTOR(S) : JABLONER & NGUYEN

It is certified that error appears in the above-identified patent and that said Letters Patent is hereby corrected as shown below:

Column 24, Line 44

"processing"   should read   --producing--

Column 24, Line 44

"plyarylene"   should read   --polyarylene--

Column 24, Line 56

"averge"   should read   --average--

Column 24, Line 65

"equilvalent"   should read   --equivalent--

Column 24, Line 67

"equivaIent"   should read   --equivalent--

UNITED STATES PATENT AND TRADEMARK OFFICE
CERTIFICATE OF CORRECTION

PATENT NO. : 4,789,722
DATED : DECEMBER 6, 1988
INVENTOR(S) : JABLONER & NGUYEN

It is certified that error appears in the above-identified patent and that said Letters Patent is hereby corrected as shown below:

Column 25, Line 28

"equilvalent" should read --equivalent--

Column 25, Line 39

"differnet" should read --different--

Column 25, Line 42

"alkai" should read --alkali--

Column 25, Line 48

"plyarylene" should read --polyarylene--

Column 25, Line 59

"claim  " should read --claim 2--

Column 27, Line 21
"halogen-termninated" should read -- halogen-terminated --.

UNITED STATES PATENT AND TRADEMARK OFFICE
CERTIFICATE OF CORRECTION

PATENT NO. : 4,789,722

DATED : DECEMBER 6, 1988

INVENTOR(S) : JABLONER & NGUYEN

It is certified that error appears in the above-identified patent and that said Letters Patent is hereby corrected as shown below:

Column 27, Line 34

"accoraance" should read --accordance--

Column 27, Line 50

"4,4'-dichlorodiphenylsulfone. sulfone" should read
   --4,4'-dichlorodiphenylsulfone--

Column 28, Line 50

"halogen" should read --halogens--.

Column 28, Line 30

"dihyroxy" should read -- dihydroxy --.

Signed and Sealed this

Twenty-ninth Day of August, 1989

*Attest:*

DONALD J. QUIGG

*Attesting Officer*      Commissioner of Patents and Trademarks